US012021337B2

(12) United States Patent
Martineau et al.

(10) Patent No.: US 12,021,337 B2
(45) Date of Patent: Jun. 25, 2024

(54) HIGH VOLTAGE ELECTRIC SWIVEL ARRANGEMENT

(71) Applicant: SINGLE BUOY MOORINGS INC., Marly (CH)

(72) Inventors: Eric Martineau, Bât. Aigue Marine (MC); Mathias Bertrand, Bât. Aigue Marine (MC); Jean Pierre Benoit, Bât. Aigue Marine (MC)

(73) Assignee: SINGLE BUOY MOORINGS INC., Marly (CH)

( * ) Notice: Subject to any disclaimer, the term of this patent is extended or adjusted under 35 U.S.C. 154(b) by 281 days.

(21) Appl. No.: 17/761,225

(22) PCT Filed: Sep. 15, 2020

(86) PCT No.: PCT/EP2020/075712

§ 371 (c)(1),
(2) Date: Mar. 17, 2022

(87) PCT Pub. No.: WO2021/052932

PCT Pub. Date: Mar. 25, 2021

(65) Prior Publication Data

US 2022/0376451 A1 Nov. 24, 2022

(30) Foreign Application Priority Data

Sep. 17, 2019 (EP) .................................... 19197708

(51) Int. Cl.
*H01R 39/64* (2006.01)
*H01R 39/08* (2006.01)
*H01R 39/38* (2006.01)

(52) U.S. Cl.
CPC ............ *H01R 39/64* (2013.01); *H01R 39/08* (2013.01); *H01R 39/38* (2013.01)

(58) Field of Classification Search
CPC ...... H01R 39/64; H01R 39/643; H01R 39/02; H01R 39/08; H01R 39/10; H01R 39/38; H01R 39/385; H01R 39/39
See application file for complete search history.

(56) References Cited

U.S. PATENT DOCUMENTS 7,887,333 B1 * 2/2011 Justin .................... H01R 39/64 439/21
2008/0121162 A1 * 5/2008 Erstad ..................... B63J 99/00 439/24

(Continued)

FOREIGN PATENT DOCUMENTS

WO WO-2016119001 A1 * 8/2016 ............. B60L 53/16

OTHER PUBLICATIONS

International Search Report for PCT/EP2020/075712, dated Dec. 14, 2020, 3 pages.

(Continued)

*Primary Examiner* — Renee S Luebke
*Assistant Examiner* — Paul D Baillargeon
(74) *Attorney, Agent, or Firm* — NIXON & VANDERHYE

(57) ABSTRACT

A swivel arrangement including high voltage electrical swivels concentrically arranged around a common axis, each swivel including: a first annular housing part and a second annular housing part together defining an internal annular volume; a first solid electrical conductor stationary with respect to the first annular housing part, and a second solid electrical conductor stationary with respect to the second annular housing part, wherein the first and second electrical conductors are arranged within the internal annular volume for making conductive sliding contact with each other, wherein the first annular housing part and second annular housing part are rotatable relative to each other around the common axis while the first and second electrical conductors (Continued)

Figure 1A:
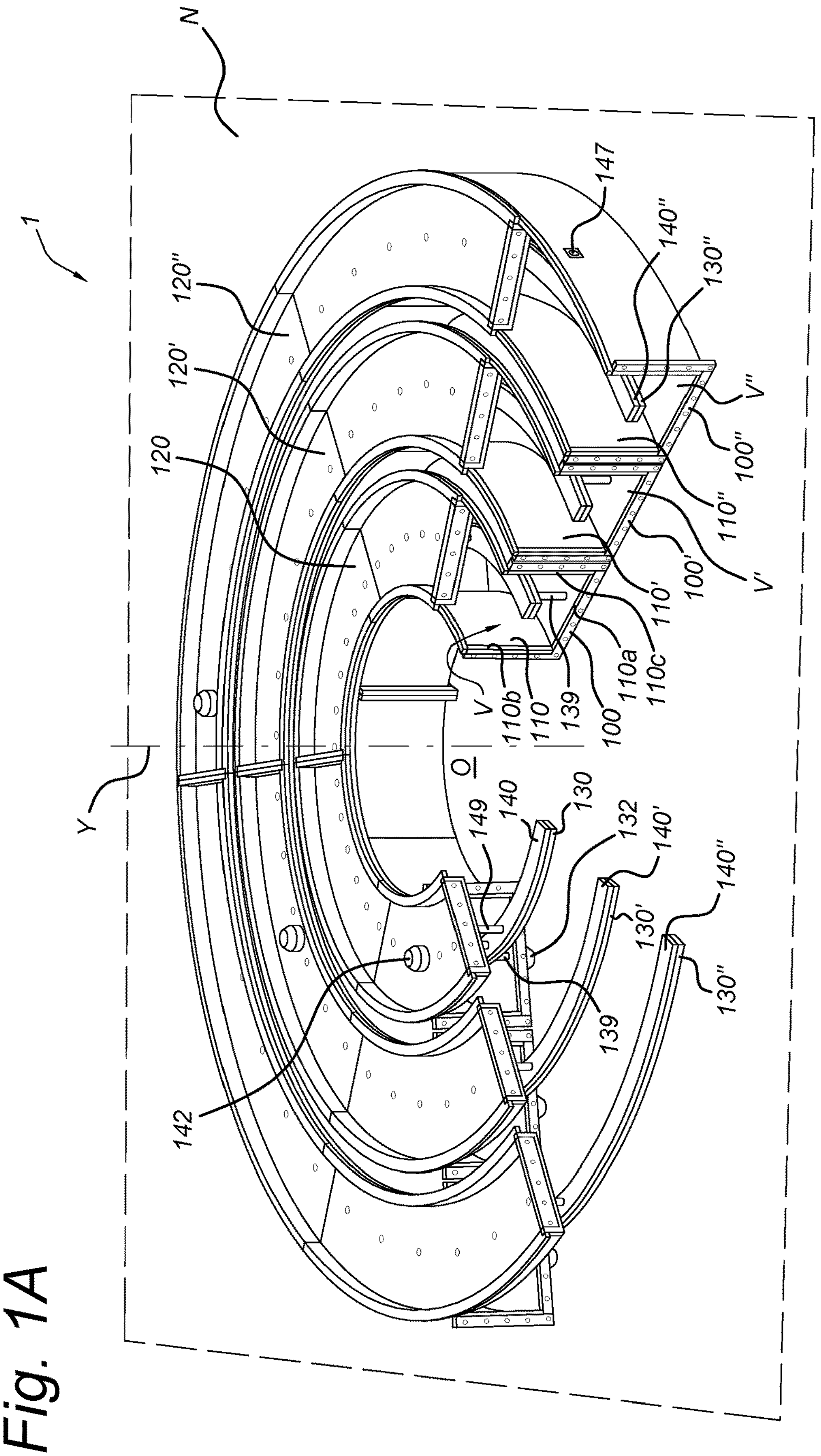

are in sliding contact with each other; wherein the swivels are arranged concentrically around the common axis so that a plane normal to the axis intersects at least two, preferably three, of the electrical swivels.

20 Claims, 3 Drawing Sheets

(56) References Cited

U.S. PATENT DOCUMENTS

| | | | | |
|---|---|---|---|---|
| 2010/0151700 | A1* | 6/2010 | Brown | H01R 39/64 439/23 |
| 2016/0043505 | A1* | 2/2016 | Wu | H01R 13/11 439/217 |
| 2018/0121162 | A1 | 5/2018 | Ueno et al. | |

OTHER PUBLICATIONS

Written Opinion of the ISA for PCT/EP2020/075712, dated Dec. 14, 2020, 4 pages.

* cited by examiner

HIGH VOLTAGE ELECTRIC SWIVEL ARRANGEMENT

This application is the U.S. national phase of International Application No. PCT/EP2020/075712 filed Sep. 15, 2020 which designated the U.S. and claims priority to EP Patent Application No. 19197708.1 filed Sep. 17, 2019, the entire contents of each of which are hereby incorporated by reference.

FIELD OF THE INVENTION

The present invention relates to a high voltage electrical swivel arrangement, as may be used for instance in a vessel such as an FPSO or other floating vessel for the drilling and/or production of hydrocarbons in which the vessel rotates relative to the sea bed. The high voltage swivel arrangement comprises at least two high voltage swivels which are arranged around a common axis. The invention further relates to a method for assembling such a swivel arrangement around a tube for transporting a liquid or gas, e.g. around a riser that is connected on one end to a well-head on the sea floor, and that is connected at another end to the FPSO.

BACKGROUND ART

From US 2008/0121162 A1 a device for electrical transmission of power and/or signals is known. The device includes an electric sliding system with a housing containing two stacks of electrically conductive slip rings, each stack located on a different diameter. The device holds four high voltage three-phase circuits as well as two low voltage circuits. The housing is connected to a support structure on board the vessel, and a brush carrier structure is in sliding contact with the slip rings. The brush carrier structure is fixed to a turret and extends through a circumferential opening in the housing. Along the circumferential opening, a seal is provided for substantially closing off those parts of the opening through which the brush carrier structure does not protrude, though the seal must leave open the portion though which the brush carrier protrudes. A swivel unit extends centrally through the housing, and the housing is constructed from several housing sections which may be assembled together using a support track.

A drawback of the known device is that, despite the seal, there is a significant risk of transfer of fluid from the interior of the housing to its exterior, and vice versa, which can cause short circuiting between the high voltage circuits. It is an object of the invention to provide a high voltage swivel arrangement in which this drawback is at least partially overcome.

SUMMARY OF THE INVENTION

To this end, the present invention provides a swivel arrangement, comprising a plurality of high voltage electrical swivels arranged around a common axis, each swivel comprising: a first annular housing part and a second annular housing part together defining an annular interior volume; a first solid electrical conductor stationary with respect to the first annular housing part, and a second solid electrical conductor stationary with respect to the second annular housing part, wherein the first and second electrical conductors are electrically isolated from the first and second housing parts and are arranged within the annular interior volume for making conductive sliding contact with each other; wherein the first annular housing part and second annular housing part of each electrical swivel are rotatable relative to each other around said common axis while the first and second electrical conductors thereof are in sliding contact with each other; wherein the first and second annular housing parts of the plurality of swivels together define a central through opening through which the common axis extends; and wherein the electrical swivels of the swivel arrangement are arranged concentrically around the common axis in such a manner that a plane normal to said axis intersects at least two, preferably at least three, of the electrical swivels; and wherein the second annular housing parts of the swivels are adapted for rotating independently from each other around the common axis. Generally, the first and second housing parts are made of, or comprise, a metal, and the first and second electrical conductors are spaced apart as well as electrically isolated from these housing parts by spacers that comprise an electrically isolating material.

As the first and second electrical conductors of each swivel are arranged within the interior volume of the corresponding swivel, the first and second housing parts together can substantially completely close off the interior volume. In this manner, any sparks that might occur within the interior space are prevented from propagating to outside of the interior space. Moreover, leakage of isolating fluid—if any—between the interior volume and the exterior of the swivel can be substantially prevented.

Generally, the interior space will be filled with an isolating liquid, to prevent or reduce formation of sparks in a high-voltage environment, though it is also possible to instead fill the interior space with an isolating gas suitable for high-voltage environments. Herein, by high voltage is meant a voltage of 3 kV or more. At such voltages, sparks can easily occur between conductions if the conductors are not sufficiently isolated. Suitable isolating liquids comprise oil and/or a dielectric liquid or a mixture thereof. Suitable gases for providing electrical isolation in a high-voltage environment include $SF_6$, $N_2$, $CO_2$, $(CF_3)_2CFC$, $C_4F_7N$, or a mixture thereof, and the like. A particularly suitable isolating gas mixture is provided by General Electric under the market name $g^3$ and has a considerably lower global warming potential than $SF_6$.

During use, the swivel arrangement is preferably arranged with its axis extending substantially vertically. This allows high voltage electrical swivels to be added to the arrangement without a substantial increase in the height of the arrangement along the common axis. Often on vessels, such as FPSO's, where the swivel arrangement of the invention is to be used, the amount of available vertical space is limited, whereas horizontal space is more readily available.

In an embodiment the first annular housing parts are fixed with respect to each other. The first annular housing parts thus rotate in conjunction around the common axis.

In an embodiment the second annular housing parts are fixed with respect to each other. Thus, during use, when the swivel arrangement is mounted to a vessel, the second housing part may be mounted stationary with respect to the deck of the vessel. However, in an alternative embodiment the second annular housing parts of the swivels are adapted for rotating independently from each other around the common axis. This embodiment provides additional flexibility during mounting of the swivel arrangement to a vessel, as the exact angle of electrically conductive lines, e.g. from the deck of the vessel, to each of the second connectors relative to the common axis does not have to be known beforehand. Preferably, once all swivels of the swivel arrangement have been mounted, the second annular housing parts of all of the swivels are fixed relative to each other to ensure that during use all of the second annular housing parts rotate in conjunction around the common axis relative to the first housing parts.

In an embodiment the opening has a diameter of at least 0.5 m, preferably at least 1.0 m. This typically is sufficient to allow one or more risers for hydrocarbons to pass through the opening. The risers are generally connected at an upper end to a vessel for oil or gas storage and/or production, and at a lower end to a well head at the sea floor.

In an embodiment for each of the swivels the first housing part and the second housing part substantially close off, preferably substantially completely, the interior volume. This prevents sparks from exiting the interior space, and may also prevent liquid and/or fluid from leaking out of the interior to the exterior of the swivel. Herein, the interior space is substantially closed off if it is liquid tight in such a manner that during normal use when the common axis is substantially vertical, liquid is substantially prevented from leaking through or between the first and second housing portions out of the interior space.

In an embodiment, the second housing portion has one or inner grooves along a circumference facing the common axis, and has one or more outer grooves along a oppositely facing circumference of the second housing portion, wherein the first seal is partially arranged in the one or more inner grooves, and wherein the second seal is partially arranged in the one or more outer grooves. This arrangement facilitates manufacture and assembly of the swivel, and allows the second housing portion to be detached from the first housing portion, e.g. for maintenance, substantially without liquid leaking out of the first housing portion. Labyrinth seals in particular have been found to provide a seal which required little maintenance, though other seals, e.g. seals which provide water tightness such as face seals which may be pressurized, may be used instead.

In an embodiment the seals are arranged between the interior volume and the one or more bushings or bearings. The bushings or roller bearings of the swivel are thus kept substantially spaced apart from the electrical conductors and/or any liquid that may be present in the interior space.

In an embodiment, for each of the swivels the first housing portion is formed as a substantially U-shaped ring having a circumferential base and two circumferential legs having facing sides which extend from the base, e.g. in a direction normal to the base. In general, when during use the common axis is substantially vertical, the base will be arranged below the first and second conductors with the legs extending from the base to above the first and second conductors, so that liquid—if any—in the interior space for isolating the first and second can be substantially contained in the first housing portion, even if the second housing portion is temporarily removed. Preferably, the second housing part comprises a circumferential section which is arranged at least partially between the facing sides of the two legs for substantially closing off the interior volume. The second housing part may be substantially shaped as a plate that is provided with a flange at its inner and/or outer diameter, so that when with the circumferential section is arranged partially between the facing sides of the two legs, part of the flange(s) extends directly above the legs. The second housing part typically is arranged at an upper side of the swivel, above the circumferential base of the first housing portion.

In an embodiment the first conductor is formed as a ring with louvers for contacting a facing side of the second conductor, or the second conductor is formed as a ring with louvers for contacting a facing side of the first conductor. Preferably, the louvres are arranged on horizontally oriented surfaces of the first or second conductor. For instance, the first conductor may be formed as a ring having a substantially smooth surface that is in contact with a facing surface of the second conductor, wherein the facing surface of the second conductor is provided with louvres, or vice versa. The louvers ensure good contact between the first and second conductors, even if the first or second conductors have slightly deformed.

In an embodiment the first and/or second conductor are made of or comprise copper or a copper alloy.

In an embodiment, when seen in projection onto a plane parallel to and through the common axis, all swivels of the plurality of swivels at least partially overlap.

In an embodiment the plurality of high voltage electrical swivels comprise or are monophasic swivels. A monophasic swivel is adapted for transferring only a single phase of electrical power. Thus, the risk of short a short circuit occurring within such a monophasic swivel is significantly reduced when compared to multiphasic swivels.

In an embodiment, the first and/or second electrical conductor has an annular shape with a centre axis substantially coinciding with the common axis. The annular shape of each electrical conductor may be formed by annular segments which together form a complete ring.

In a preferred embodiment, in each swivel, the first and second electrical annular conductors are arranged for contacting each other substantially in a plane normal to the common axis. In this embodiment, the first conductor and second conductors are preferably substantially completely arranged on opposite sides of said plane.

In an embodiment, each swivel further comprises one or more bushings or roller bearings via which the first annular housing part is rotatably supported on the second annular housing part, preferably wherein the bushings or bearings are arranged between the first and second housing part. Generally, roller bearings are preferred as they allow movement with low torque and often support high loading in several directions and typically have a long expected design life. If roller bearings are used, two sets of roller bearings are generally used in a single swivel, on set arranged at an inner diameter of the swivel between the first and second housing part, and the other set arranged at an outer diameter of the swivel between the first and second housing part. However, in other cases bushings may be used, for instance if greater speed of manufacture and/or lower cost is needed than can be achieved using roller bearings. Typically, if bushings are used, two sets of bushings are used in a single swivel, with one set arranged at inner diameter of the swivel between the first and second housing part, and the other set arranged at an outer diameter of the swivel between the first and second housing part.

In an embodiment each swivel further comprises two spaced apart seals between the first housing part and the second housing part, for preventing isolating liquid and/or isolating fluid from passing between the first and second housing part from the interior to the exterior of the swivel. Preferably, a first of the two seals is provided near an inner diameter of the swivel between first and second housing part and a second of the two seals is provided near an outer diameter of the swivel between first and second housing part, wherein the first and second seal together seal the interior space.

In an embodiment, the second housing portion has one or inner grooves along a circumference facing the common axis, and has one or more outer grooves along a oppositely facing circumference of the second housing portion, wherein the first seal is partially arranged in the one or more inner grooves, and wherein the second seal is partially arranged in the one or more outer grooves. This arrangement facilitates manufacture and assembly of the swivel, and allows the second housing portion to be detached from the first housing portion, e.g. for maintenance, substantially without liquid leaking out of the first housing portion. Labyrinth seals in particular have been found to provide a seal which required little maintenance, though other seals, e.g. seals which provide water tightness such as face seals which may be pressurized, may be used instead.

In an embodiment the seals are arranged between the interior volume and the one or more bushings or bearings. The bushings or roller bearings of the swivel are thus kept substantially spaced apart from the electrical conductors and/or any liquid that may be present in the interior space.

In an embodiment, one or more of the swivels, e.g. all of the swivels, are provided with an isolating fluid in the corresponding interior volume, wherein the first and second conductors are completely submerged in the isolating fluid. The fluid may be an electrically isolating liquid, such as a dielectric liquid, or an electrically isolating gas or gas mixture, e.g. as described above. The isolating fluid both reduces the chance of sparks from occurring within the interior space, and reduces the risk of corrosion of the first and/or second electrical conductors. This makes the swivel arrangement particularly suitable for use in an abrasive environment, such as at sea where metals easily corrode.

In an embodiment, one or more swivels of the arrangement are provided with an inlet port for filling the interior volume with isolating fluid, preferably wherein the inlet port is completely arranged vertically above the first and second conductors.

In an embodiment the first housing part is provided with a first connector which extends there through, and wherein the second housing part is provided with a second connector which extends there through. The first connector preferably extends through side of the first housing part a side that is substantially normal to the common axis, and the second connector preferably extends from a side of the second housing part that is substantially normal to the common axis as well. When the swivel arrangement is used with the common axis in a vertical orientation, several swivels can be arranged concentrically around the axis, with the connectors remaining accessible. If the first housing portions of the swivels are U-shaped as described herein, then the first connector may extend through the base.

According a second aspect, the present invention provides a method for mounting a swivel arrangement according to the present invention around a tube for transporting a liquid, wherein the method comprises: arranging a first swivel of the swivel arrangement; subsequently arranging a second swivel of the swivel arrangement around the first swivel in such a manner that a plane normal to the common axis intersects the first and second swivel. In this manner, the swivel arrangement can easily be mounted, in particular above water, and individual swivels can be added to the arrangement as desired without significantly increasing the height of the arrangement along the common axis.

In an embodiment the method further comprises: subsequently arranging a third swivel of the swivel arrangement concentrically around the second swivel in such a manner that the plane normal to the common axis intersects the first, second and second swivel. It will be appreciated that further swivels may be added. It has been found a swivel arrangement comprising that at least up to 8 swivels that are arranged concentrically can be mounted in this manner.

In an embodiment the swivel arrangement is a swivel arrangement comprising a first and second housing part each comprising a plurality of detachably connected annular sector portions as described herein, wherein arranging the first and second swivels around the tube comprises placing sectors of the first and/or second annular housing portions of said swivels around the tube and fixing the corresponding sectors of the first and/or second annular housing portions of each of said swivels with respect to each other. Preferably, first the sectors of the first housing portion of a swivel are attached to each other to form the entire first housing portion, after which the sectors of the second housing portion placed on the first housing portion and attached to each other to from the entire second housing portion. The sector portions may be of substantially equal size, and the number of sector portions is preferably is at least 4, more preferably at least 6, allowing easy construction of a swivel around the tube.

According to a third aspect, the invention provides a vessel, such as an FPSO, comprising a swivel arrangement according to the present invention, preferably with the common axis oriented substantially vertically. The vessel may further comprise one or more connectors for risers which extend from the sea floor to the vessel, wherein the connectors for the risers are arranged above the swivel arrangement when seen along the common axis.

SHORT DESCRIPTION OF DRAWINGS

Figure 1B:
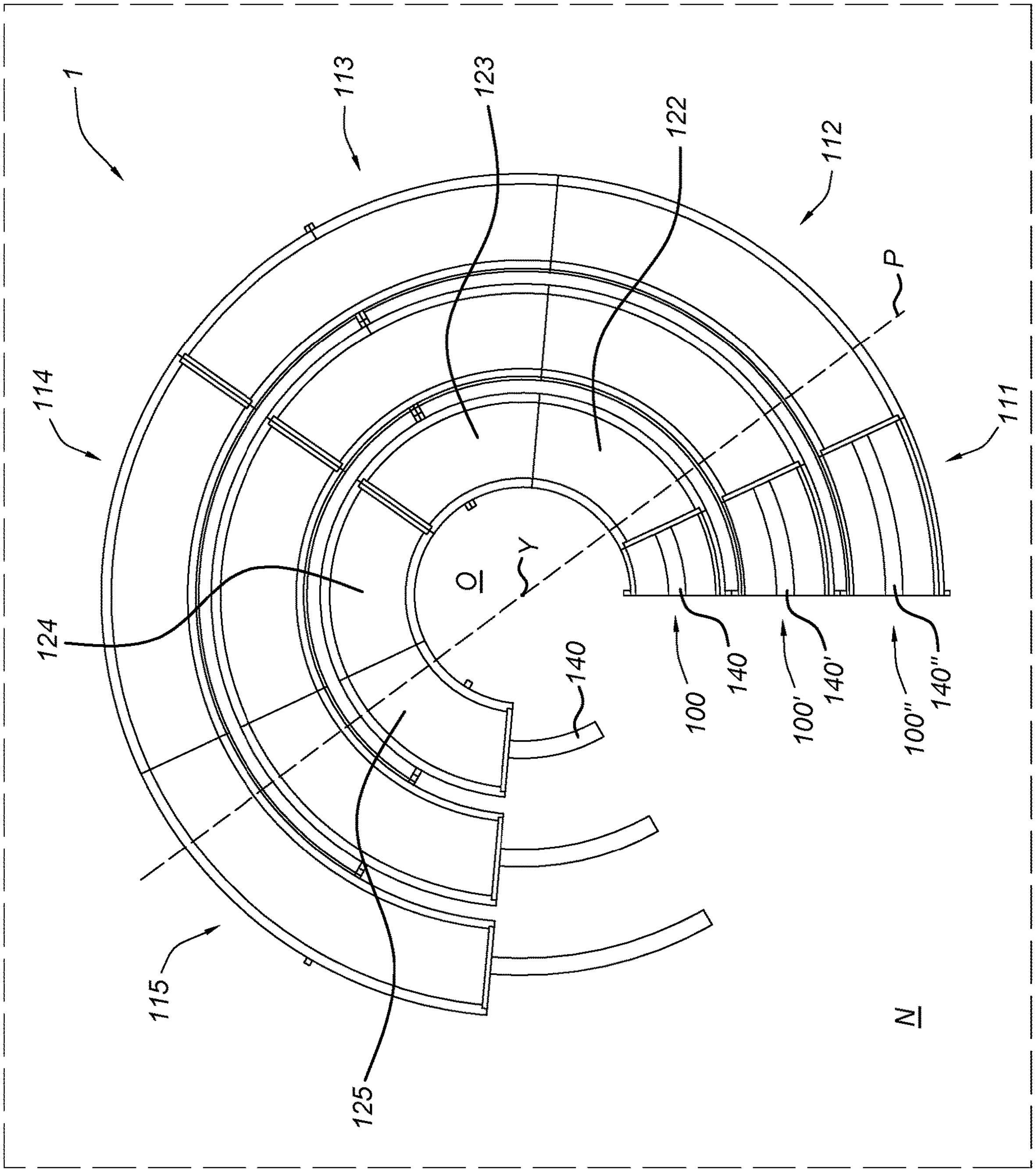
Figure 2A:
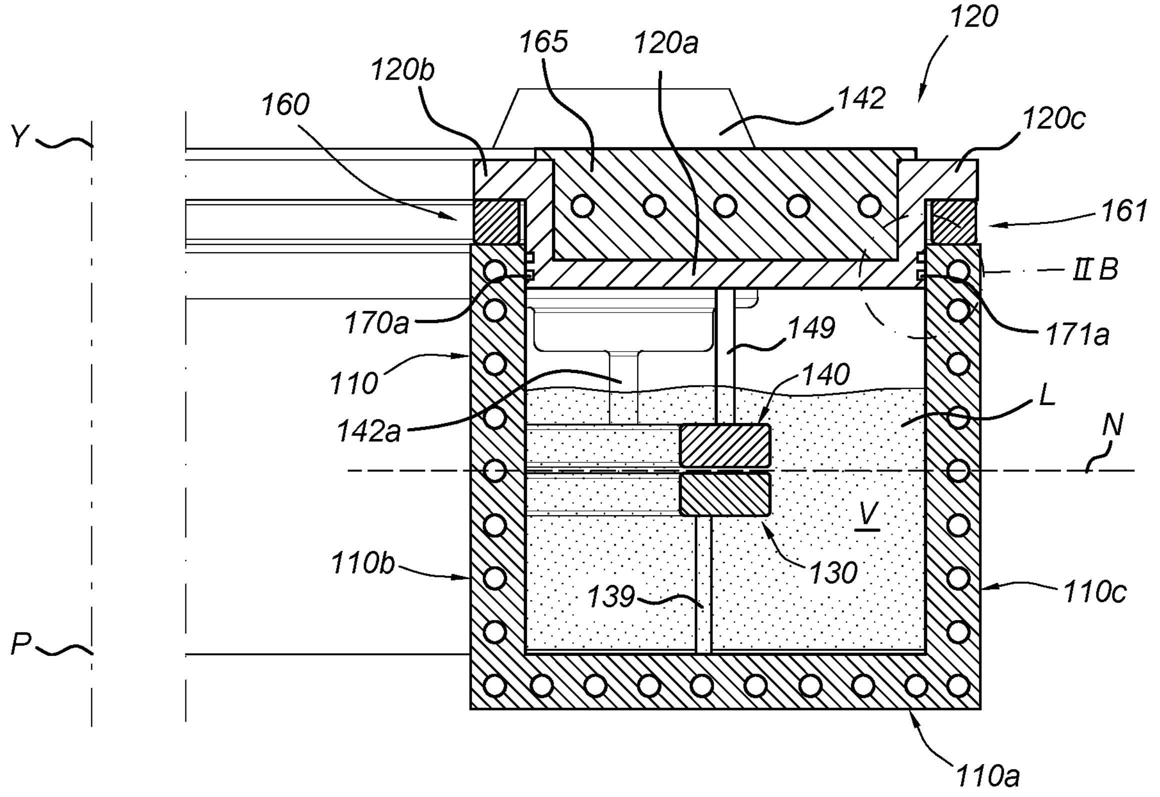
Figure 2B:
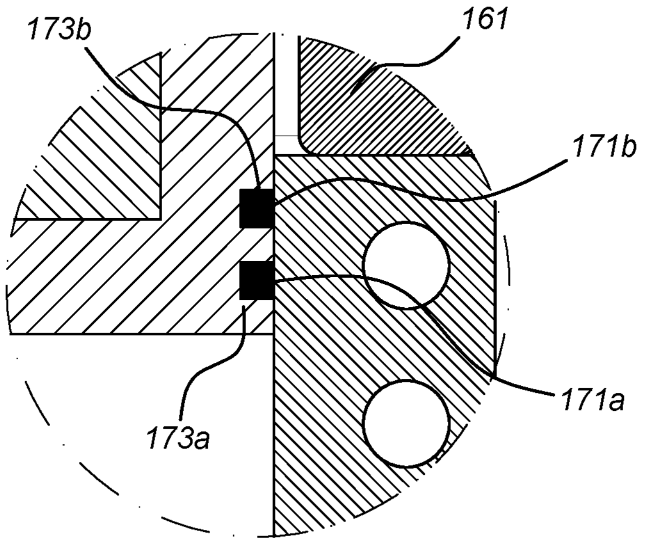
Figure 3:
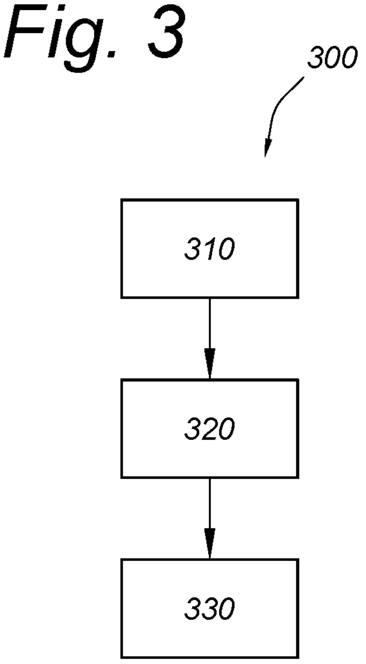

The present invention will be discussed in more detail below, with reference to the attached drawings, in which FIG. 1A schematically shows an isometric partially cut-away view of a swivel arrangement according to the invention, and FIG. 1B shows a top view thereof;

FIGS. 2A and 2B schematically shows a cross-sectional view of part of a swivel as used in a swivel arrangement according to the invention, and a detail of section IIB thereof;

FIG. 3 shows a flow chart of a method according to the invention.

DESCRIPTION OF EMBODIMENTS

FIGS. 1A and 1B respectively show a partially cut-away isometric view of a swivel arrangement 1 according to the invention, comprising three annular swivels 100, 100', 100" arranged concentrically around a common axis Y. The swivels are arranged concentrically, rather than vertically, in such a manner that the three swivels 100, 100', 100" are intersected by a common plane N which is normal to the axis Y. Addition of further swivels is thus possible without increasing the height of the arrangement along the direction Y. The swivels are arranged around a central through opening which extends through the arrangement and through which a tube, such as risers or the like, may extend.

In FIGS. 1A and 1B the arrangement is shown in a partially cut away fashion, to allow a view of the interior volume V of swivel 100. The swivel 100 comprises a first annular housing portion 110 which has a U-shaped cross-section, the U-shape having a base 100*a* which extends substantially parallel to the plane N, the base further having two legs 100*b*, 100*c* which face each other and extend from the base substantially parallel to the axis Y. At an upper side of the first housing portion 110, a second housing portion 120 is arranged, which is partially arranged between the facing legs 100_b_, 100_c_ to close off the interior volume V. The second housing portion is supported via roller bearings (not shown) on the first housing portion 110, allowing rotation of the second housing portion relative the first housing portion around the axis Y. Though not shown in the example of FIG. 1A, it will be clear that instead of roller bearings a sleeve bearing or bush or the like could be used.

First housing portions 110', 110" of swivels 100' and 100" are fixed with respect to the first housing portion 110 of swivel 100. In the embodiment shown, at least during mounting of the arrangement on a vessel, the second housing portions 120, 120', 120" may rotate independent from each other around the common axis Y. However, it will be appreciated that instead the second housing portions may be rotationally fixed with respect to each other, or that the second housing portions may be fixed with respect to each other once the swivel arrangement 1 has been mounted on a vessel.

Though the swivels 100, 100', 100" have different diameters, they are constructed in similar manner, the swivels each having an annular interior volume V, V', V". Within the volume V, a first annular electrical conductor 130 is arranged stationary with respect to the first housing portion 110, and supported electrically isolated on and spaced apart from the first housing portion on electrically isolating pins 139. Likewise, a first annular electrical conductor 140 is arranged within the volume V and arranged stationary with respect to the second housing portion and attached by electrically isolating pins 149 to the second housing portion 120. During rotation of the first housing portion relative to the second housing portion, facing sides of the first and second conductors 130, 140 remain in contact with each other to provide a rotatable high voltage (i.e. 3 kV or more) electrical contact between the two conductors. At a lower side of the first housing part a first connector 132 is provided which extends from the exterior of the swivel 100, through the base 110, to the interior volume where the connector is electrically connected with the first conductor 130. At an upper side of the second housing part a second connector 142 is provided which extends there through, electrically connects to the second conductor 130. The first and second connectors 132, 142 can be attached to conductive cables or the like. Swivels 100' and 110" are provided with such connectors as well.

The interior volumes V, V', V" are typically filled with an insulating fluid in such a manner that both the first and second conductors are completely submerged by the fluid. In order to facilitate supply of insulating fluid to interior volume V", a fluid inlet port 145 is provided which is generally closed except when isolating fluid is supplied therethrough into the interior volume V'". The port lies completely at a height above both the first and second electrodes, so that if the fluid is a liquid that has reached the level of the port, the first and second electrodes are completely submerged in the isolating fluid.

The top view of FIG. 1B shows more clearly that each of the swivels is constructed from a number of first and second housing portion segments. First housing portion 110 comprises 6 annular sector portions, of which portions 111,112, 113,114,115 are indicated, which together form the annular first housing portion 110. The second housing portion 120 also comprises 6 annular sector portions, of which portions 122, 123, 124 and 125 are shown, and which together from the annular second housing portion 120. By constructing the swivels sector by sector, the swivels can be mounted around tubes, such as risers of a vessel, without having to move the tube and without having to slide the swivels over an end of the tube along the longitudinal direction of the tube. Connector plates 165 are provided between sector portions 123 and 124 to allow these portions to be bolted together. The sector portions 122 and 125 are provided with connector plates as well, to allow these to be bolted to two respective adjacent sector portions that are not shown partially cut-away views of in FIGS. 1A and 1B. In the example shown, sector portions 122 and 123 are connected to each other by welding, as are sector portions 124 and 125. When seen in projection onto a plane P, which is parallel to the common axis Y and extends through said common axis Y, the swivels 100, 100' and 100" at least partially overlap each other.

FIG. 2A shows a detailed cross-sectional side view of part of swivel according 100 to the invention. The first housing portion 110 has a substantially U-shaped cross-section, with a base 110_a_ that extends normal to axis Y, and with two legs 110_b_, 110_c_ that extend from the base in a direction parallel to the axis Y. The second housing portion 120 comprises a portion 120_a_ that fits between the facing legs 110_b_,110_c_ and substantially closes off the interior volume V, so that an isolating liquid L is contained by the first and second housing portion. In FIG. 2A, the first and second conductors are completely submerged by the isolating liquid L, and a conductive rod 142_a_ extends from the connector 142 through the isolating liquid L and conductively connects the connector to the second conductor 140. Though not shown in FIG. 2A, the first conductor 130 is conductively connected in a similar fashion to connector 132.

The second housing portion further comprises an inner circumferential flange 120_b_ and an outer circumferential flange 120_c_. A first set of bearings 160 is arranged at an inner circumference of the swivel 100 between the inner circumferential flange 120_b_ and the inner leg 110_b_, and a second set of bearings 161 is arranged at an outer circumference of the swivel between the outer circumferential flange 120_c_ and the outer leg 110_c_. A first circumferential seal 170_a_ is partially arranged in a corresponding inner circumferential groove of portion 120_a_, and second circumferential seals 171_a_, 171_b_ that are partially arranged in respective outer circumferential grooves 173_a_,173_b_ of portion 120_c_, together seal of the interior volume. A detail of the second circumferential seals 171_a_,171_b_ is shown in FIG. 2B.

FIG. 3 schematically shows a flowchart of a method 300 of the invention, for mounting a swivel arrangement around one or more tubes. The one or more tubes may for instance comprise risers of an FPSO. First, in step 310 a first swivel of a swivel arrangement of the invention as described herein is arranged around the tube. Next in step 320 a second swivel of a swivel arrangement of the invention is arranged concentrically around the first swivel, in such a manner that a plane normal to the common axis intersects the first and second swivel. Though the respective first housing portions of the first and second swivel will be fixed with respect to each other, during mounting the second housing portions may be rotatable independent from each other around the common axis.

Optionally, a step 330 is carried out, in which a third swivel of a swivel arrangement is arranged concentrically around the second swivel in such a manner that the plane normal to the common axis intersects the first, second and third swivel.

When the housing portions of the first, second and/or third swivel are formed as annular sectors, the first, second and/or third swivel may conveniently be around the tube without having to be guided over a top or lower end of the tube.

Also optionally, once the entire swivel arrangement has been mounted around the one or more tubes, the second housing portions of the swivels may be fixed with respect to each other.

In summary, the invention relates to a swivel arrangement comprising a plurality of high voltage electrical swivels concentrically arranged around a common axis, each swivel comprising: a first annular housing part and a second annular housing part together defining an annular interior volume; a first solid electrical conductor stationary with respect to the first annular housing part, and a second solid electrical conductor stationary with respect to the second annular housing part, wherein the first and second electrical conductors are arranged within the annular interior volume for making conductive sliding contact with each other, wherein the first annular housing part and second annular housing part are rotatable relative to each other around said common axis while the first and second electrical conductors are in sliding contact with each other; wherein the swivels are arranged concentrically around the common axis in such a manner that a plane normal to the axis intersects at least two, preferably at least three, of the electrical swivels. The swivel arrangement may comprise or form a stack of the swivels in a concentric arrangement.

The present invention has been described above with reference to a number of exemplary embodiments as shown in the drawings. Modifications and alternative implementations of some parts or elements are possible, and are included in the scope of protection as defined in the appended claims.

The invention claimed is:

1. A swivel arrangement comprising a plurality of high voltage electrical swivels arranged around a common axis, each high voltage electrical swivel comprising:

a first annular housing part and a second annular housing part together defining an annular interior volume;

a first solid electrical conductor stationary with respect to the first annular housing part, and a second solid electrical conductor stationary with respect to the second annular housing part, wherein the first and second electrical conductors are electrically isolated from the first and second housing parts and are arranged within the internal annular volume for making conductive sliding contact with each other;

wherein the first annular housing part and second annular housing part of each electrical swivel are rotatable relative to each other around said common axis while the first and second electrical conductors thereof are in sliding contact with each other;

wherein the first and second annular housing parts of the plurality of swivels together define a central through opening through which the common axis extends; and wherein the electrical swivels are arranged concentrically around the common axis in such a manner that a plane normal to said axis intersects at least two of the electrical swivels.

2. The swivel arrangement according to claim 1, wherein the second annular housing parts of the swivels are adapted for rotating independently from each other around the common axis.

3. The swivel arrangement according to claim 2, wherein for each of said swivels the first housing part and the second housing part substantially close off the interior volume.

4. The swivel arrangement according to claim 2, wherein for each of said swivels the first housing portion is formed as a substantially U-shaped ring having a circumferential base and two circumferential legs having facing sides which extend from the base.

5. The swivel arrangement according to claim 1, wherein for each of said swivels the first housing part and the second housing part substantially close off the interior volume.

6. The swivel arrangement according to claim 5, wherein for each of said swivels the first housing portion is formed as a substantially U-shaped ring having a circumferential base and two circumferential legs having facing sides which extend from the base.

7. The swivel arrangement according to claim 1, wherein for each of said swivels the first housing portion is formed as a substantially U-shaped ring having a circumferential base and two circumferential legs having facing sides which extend from the base.

8. The swivel arrangement according to claim 7, wherein the second housing part comprises a circumferential section which is arranged at least partially between the facing sides of the two legs for substantially closing off the interior volume.

9. The swivel arrangement according to claim 1, wherein the first conductor is formed as a ring provided with louvers for contacting a facing side of the second conductor, or wherein the second conductor is formed as a ring provided with louvers for contacting a facing side of the first conductor.

10. The swivel arrangement according to claim 1, wherein when seen in projection onto a plane parallel to and through the common axis, all swivels of the plurality of swivels at least partially overlap.

11. The swivel arrangement according to claim 1, wherein the plurality of high voltage electrical swivels are or comprise monophasic swivels.

12. The swivel arrangement according to claim 1, wherein the first and/or second electrical conductor has an annular shape with a center axis substantially coinciding with the common axis.

13. The swivel of claim 12, wherein, in each swivel, the first and second electrical annular conductors are arranged for contacting each other substantially in a plane normal to the common axis.

14. The swivel Swivel arrangement according to claim 1, wherein each swivel further comprises one or more bushings or roller bearings via which the first annular housing part is rotatably supported on the second annular housing part.

15. The swivel arrangement according to claim 1, each swivel further comprising two spaced apart seals between the first housing part and the second housing part.

16. The swivel arrangement according to claim 1, wherein the first annular housing part comprises a plurality of detachably connected annular sector portions which together from the first annular housing part, and wherein the second housing part comprises a plurality of detachably connected annular sector portions which together form the second annular housing part.

17. The swivel arrangement of claim 1, wherein the plane normal to the axis intersects at least three of the electrical swivels.

18. Method for mounting a swivel arrangement according to claim 1 around a tube for transporting a liquid, the method comprising:

arranging a first swivel of said swivel arrangement according around the tube;

subsequently arranging a second swivel of said swivel arrangement concentrically around the first swivel in such a manner that a plane normal to the common axis intersects the first and second swivel.

19. The method according to claim 18, further comprising:

subsequently arranging a third swivel of the swivel arrangement concentrically around the second swivel in such a manner that the plane normal to the common axis intersects the first, second and third swivel.

20. Method for mounting a swivel arrangement according to claim 1 around a tube for transporting a liquid, the method comprising:

arranging a first swivel of said swivel arrangement according around the tube;

subsequently arranging a second swivel of said swivel arrangement concentrically around the first swivel in such a manner that a plane normal to the common axis intersects the first and second swivel, wherein the first annular housing part comprises a plurality of detachably connected annular sector portions which together from the first annular housing part, and wherein the second housing part comprises a plurality of detachably connected annular sector portions which together form the second annular housing part, and wherein arranging the first and second swivels around the tube comprises placing sectors of the first and/or second annular housing portions of said swivels around the tube and fixing the corresponding sectors of the first and/or second annular housing portions of each of said swivels with respect to each other.

* * * * *